United States Patent
Shivashankar et al.

(10) Patent No.: US 9,912,523 B2
(45) Date of Patent: Mar. 6, 2018

(54) SYSTEMS AND METHODS FOR MULTI-VARIATE ATTRIBUTE CORRELATION

(71) Applicant: Telefonaktiebolaget L M Ericsson (publ), Stockholm (SE)

(72) Inventors: Subramanian Shivashankar, Chennai (IN); Manoj Prasanna Kumar, Chennai (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 340 days.

(21) Appl. No.: 14/600,423

(22) Filed: Jan. 20, 2015

(65) Prior Publication Data

US 2016/0210348 A1  Jul. 21, 2016

(51) Int. Cl.
- G06F 7/00 (2006.01)
- G06F 17/30 (2006.01)
- H04L 12/24 (2006.01)
- H04L 12/26 (2006.01)

(52) U.S. Cl.
CPC .......... H04L 41/0631 (2013.01); H04L 43/08 (2013.01)

(58) Field of Classification Search
CPC ............................ H04L 41/0631; H04L 43/08
See application file for complete search history.

(56) References Cited

U.S. PATENT DOCUMENTS

| | | | | |
|---|---|---|---|---|
| 2008/0059259 A1* | 3/2008 | Kitayama | ............ | G06Q 10/063 705/7.11 |
| 2011/0119040 A1* | 5/2011 | McLennan | .............. | G06F 17/18 703/2 |
| 2012/0311030 A1* | 12/2012 | Lin | .......................... | G06F 15/16 709/204 |
| 2014/0095413 A1* | 4/2014 | Kirillov | ........... | H04N 21/25883 706/12 |
| 2014/0108086 A1* | 4/2014 | Prieto | ................ | G06Q 10/0637 705/7.23 |
| 2014/0280576 A1* | 9/2014 | Cowan | .................. | H04L 67/306 709/204 |

OTHER PUBLICATIONS

Hou Manli, May 2011, "Genetic Algorithm Based on Attribute Correlation for Multi-label Claasification", pp. 88-92.*

* cited by examiner

*Primary Examiner* — Tuan A Pham
(74) *Attorney, Agent, or Firm* — Patent Portfolio Builders, PLLC

(57) ABSTRACT

The formulation of meta-correlation method as a graph based problem is disclosed. The meta-correlation method utilizes one or more correlation techniques, and also captures latent factors critical for the business utility in hand is described. The method also leverages a small example set to bootstrap for the target utility case. The proposed method can easily work for attribute groups of any size, not just attribute groups consisting of pairs of attributes.

12 Claims, 5 Drawing Sheets

SYSTEMS AND METHODS FOR MULTI-VARIATE ATTRIBUTE CORRELATION

TECHNICAL FIELD

This disclosure relates to multi-variate attribute correlation.

BACKGROUND

Correlating attributes of telecommunication network data is necessary for various analytics use-cases, such as root cause analysis, pro-active maintenance, etc. For instance, correlating key performance indicators (KPIs) and alarm data can help in identifying KPIs that contribute to each alarm.

Attribute correlation techniques can be broadly categorized into two categories: Direct (straight forward) correlation and Indirect (statistical) correlation. Direct (straight forward) correlation can be done by simply deciphering the mathematical formula used to compute various metrics (such as KPIs). Indirect (statistical) correlation can capture latent factors, and cannot be achieved by direct correlation technique. For instance, correlating network KPIs and user mean opinion score (MOS) should capture factors such as user interest for a service, mobility pattern, weather and so on. See e.g., Fabrigar et al. (1999), "Evaluating the use of exploratory factor analysis in psychological research," Psychological Methods.

SUMMARY

In this disclosure the focus is on indirect correlation, which handles the challenges of business needs in many domains including telecommunications. Existing approaches require an assumption of the type of correlation computed (e.g., linear or non-linear, value or rank based, pair-wise or list-wise and so on). This assumption does not help in modeling the latent factors efficiently and also does not help in cases where the business needs can be a combination of more than one correlation method. Additionally, the existing approaches do not leverage the small example set that may be available.

This disclosure provides a method for multi-variate indirect correlation that can leverage all possible correlation techniques and other latent factors that could be critical for business needs, such as: revenue, quality of experience (QoE), etc. For instance, KPI1 and KPI2 could be correlated when it comes to revenue assurance, EOS code A and B could be correlated during peak hours (degradation of one might trigger the next).

A requirement to find correlated/uncorrelated pairs is as follows: $\Sigma_{A,B \in C} Corr(A,B) - \Sigma_{A,B \in U} Corr(A,B)$. The Objective is to maximize the correlation score between pairs of attributes labeled as correlated (C) and minimize the scores when labeled as uncorrelated (U). The given requirement can be reformulated as a graph meta learning problem as follows: a) consider every pair of attributes as a node, and the features are obtained using various correlation scores between the attributes; and b) in-order to capture the latent factors (Z), each node 'N' and edge 'L' will be modeled as $P(N|Z)$, $P(L|Z)$: $P(N,L,\theta) = \pi z\, P(N|Z,\theta) + \pi z\, P(L|Z,\theta)$.

The meta correlation technique also leverages the small example set by adding them as a cost in the objective function.

The following advantages can be realized: leverage various correlation techniques and also capture the latent factors involved; leverage the small example set which could be built using domain knowledge; the method can be extended to handle many grades of correlation (low, medium, high and so on) and more than two attributes (pairs) for correlation by adding more source/sink nodes and modeling groups of attributes as nodes; correlation is solved as a Machine Learning problem, so it can be tuned for any business case; can work for cases when correlation between two objects is found and if the objects are characterized by multiple attributes in turn (e.g., correlating network devices and each device is characterized by the KPIs measured in the device); and can be easily extended for cases with multiple objects where we must label the entire set as correlated or not.

Accordingly, in one aspect there is provided a method for multivariate attribute correlation. In some embodiments the method includes forming a set of attribute groups. The set of attribute groups comprises a first subset of attribute groups and a second subset of attribute groups. The first subset and the second subset are disjoint sets. The method further includes, for each attribute group in the set of attribute groups, generating a feature vector comprising a plurality of correlation measure values. The method further includes generating a correlation model for mapping feature vectors to correlation values. The method further includes, for each attribute group in the set of attribute groups, using the feature vector for the attribute group and the correlation model to generate a correlation value for the attribute group. The method further includes, for each attribute group in the set of attribute groups, logically connecting the attribute group to each other attribute group included in the set of attribute groups, wherein each logical connection between the attribute group and one of the other attribute groups is assigned a similarity value based on a determined similarity between the feature vector for the attribute group and the feature vector for the other attribute group. The method further includes, for each attribute group included in the first subset of attribute groups, assigning a label to the attribute group based on predetermined information about the correlation among the attributes in the attribute group. The method further includes selecting an attribute group from the second subset of attribute groups. The method further includes, for each logical connection connecting the selected attribute group to an attribute group included in the first subset of attribute groups, obtaining the value assigned to the logical connection. The method further includes using the obtained values and the generated correlation value for the selected attribute group, determining whether a label should be assigned to the selected attribute group. The method further includes assigning a determined label to the selected attribute group if it was determined that a label should be assigned to the selected attribute group. The method further includes repeating the last four for each other attribute group included in the second subset of attribute groups.

In some embodiments, selecting an attribute group from the second subset of attribute groups consists of randomly selecting an attribute group from the second subset of attribute groups.

In some embodiment, determining whether a label should be assigned to the selected attribute group comprises the steps of: calculating a first label value (LV1), wherein LV1 is associated with a first label (L1); calculating a second label value (LV2), wherein LV2 is associated with a second label (L2); calculating a delta value (DV), wherein DV=|LV1−LV2|; determining whether DV is greater than a predetermined threshold (T), wherein if DV>T, then a label is assigned to the selected attribute group. In some embodiments, $LV1=\alpha*\Omega(fv)+\beta*Sim\_L1$, where $\alpha$ and $\beta$ are predetermined relative weight values, fv is the feature vector for the selected attribute group, $\Omega(\ )$ is the model that maps the feature vector fv to a correlation value, and Sim_L1 is a value representing the similarity between the selected attribute group and a set of other attribute groups each of which has been assigned the first label, and $LV2=\alpha*(1-\Omega(fv))+\beta*Sim\_L2$, where Sim_L2 is a value representing the similarity between the selected attribute group and a set of other attribute groups each of which has been assigned the second label.

In some embodiments, the method further comprises determining the label to assign to the selected attribute group. In some embodiments, determining the label to assign to the selected attribute group comprises the steps of: i) for each logical connection connecting the selected attribute group to an attribute group included in the first subset of attribute groups that has been assigned a label of X, obtaining the value assigned to the logical connection and summing the obtained values to produce a first sum (SUM_1); ii) for each logical connection connecting the selected attribute group to an attribute group included in the first subset of attribute groups that has been assigned a label of Y, obtaining the value assigned to the logical connection and summing the obtained values to produce a second sum (SUM_2); iii) calculating S1=SUM_1/(SUM_1+SUM_2); iv) calculating S2=SUM_2/(SUM_1+SUM_2); and v) determining the label using the generated correlation value for the selected attribute group and one or more of S1 and S2.

In another aspect there is provided a computer apparatus for multivariate attribute correlation. The computer apparatus comprises a data storage system; and a computer system coupled to the data storage system. The computer system comprises one or more processors for performing the above described method.

The above and other aspects and embodiments are described below.

DETAILED DESCRIPTION

Described herein is a meta-correlation method that attempts to find correlated attribute pairs from sets of attributes (like KPI, EOS, MOS, alarms, QoE). The proposed method can easily be extended to handle grades of correlation such as low, medium, high and groups of correlated attributes by modifying the way nodes are modeled. Described below is a graph based meta learning procedure for the basic case of finding correlated/uncorrelated pairs of attributes from a given dataset.

There are two source and sink nodes for "correlated" and "uncorrelated" sets (there can be more based on needs). Every pair of attributes is modeled as a node in a graph. Feature representation of each node would capture multiple correlation techniques' scores such as Spearman, Pearson, cross-correlation, and so on. The edges between nodes will have an edge weight based on similarity of feature values between the two nodes. The similarity may be computed based on appropriate measures, like KL divergence for probability distributions, cosine for Boolean values, and Euclidean/absolute distance for real values and so on. All the values are preferably transformed to a common range, say 0 to 1 and aggregated. From a small labeled set of nodes, connect the nodes (pairs of attributes) to the respective source/sink nodes based on the label (correlated or not). Assign a very high edge weight to it (infinity).

Based on the small labeled set, a classifier is trained so that the classifier can classify each unlabeled node as "correlated" or "uncorrelated". The predicted value is used as an edge weight between each unlabeled node and source/sink nodes, i.e., P(Correlated|Node) will be assigned as the edge weight between the node and "correlated" class node. Similarly 1−P(Correlated|Node) will be assigned as edge weight between the node and "uncorrelated" class node.

Figure 1:
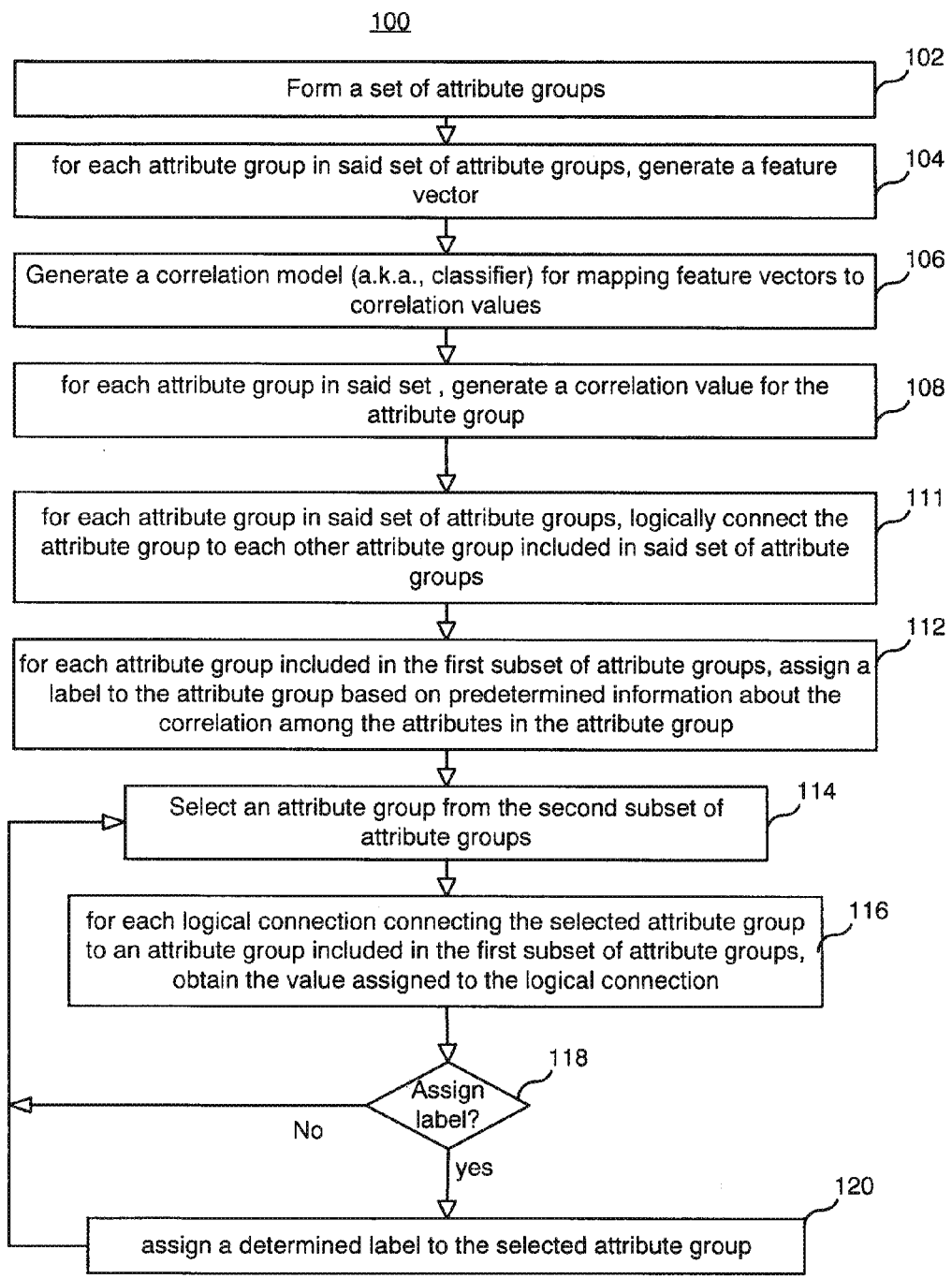
FIG. 1 is a flow chart illustrating a process according to some embodiments.

With this weighted graph, we assign the unlabeled nodes to correlated/uncorrelated class such that overall similarity of nodes assigned to each of the class is maximized and the loss of cut vertices based on edge weights is minimized. One way to achieve this is assign ranks to unlabeled nodes based on the weights to source/sink nodes (maximum of the two weights is chosen). Secondly, assign ranks based on weighted agreement on labels between neighbors. Combine the above two ranks, and pick top "K" to assign labels using both attribute and neighbor information (best value for K can be determined empirically). Re-estimate the parameters of classifier which gives P(Correlated|Node). Repeat the above steps till all nodes are classified Extending to Handle Groups of Attributes In cases where one has prior information on KPIs' logical groups such as weather, mobility, high revenue related and so on, one can consider all the logical groups as additional attributes (Z*) that can be leveraged in the proposed method. The modified objective function is given as: $P(N,L,\theta)=1/\Sigma_{z*}W_{z*}[\Sigma_{z*}W_{z*}*(P(N|\theta)+P(L|\theta))]$, where it captures the sub-group weight of additional factors ($W_{z*}$), node 'N' and edge 'L' information. Each KPI is represented additionally using a Boolean sub-group attribute vector, where 1 indicates that it belongs to the category and 0 indicates that it does not belong to the category. For a KPI pair (node in the graph), we use "AND" operator to get a Boolean vector that captures sub-group similarity. Weights over this vector are learnt separately in the same procedure. With the labeled data, the weights are initialized, and during the minimization step the weights are re-learnt. This can be achieved by learning the coefficients of each sub-group, with correlated/uncorrelated class label as the target value. These weights are used to update (re-weigh) the $P(N|\theta)$ which captures the edge weights between node and source/sink nodes. Similarly the edge weights between pairs of nodes $P(L|\theta)$ are re-weighed using the weight vector obtained in C. The re-weighed values will be normalized using $1/\Sigma_{z*}W_{z*}$ Referring now to FIG. 1, FIG. 1 is a flow chart illustrating a process 100 for multivariate attribute correlation according to an embodiment of the invention.

Process 100 may begin in step 102, where a set of attribute groups is formed. The set comprises a first subset of attribute groups and a second subset of attribute groups, wherein the first subset and the second subset are disjoint sets.

In step 104, for each attribute group in said set of attribute groups, a feature vector is generated, which feature vector comprises a plurality of correlation measure values.

In step 106, a correlation model (a.k.a., classifier) for mapping feature vectors to correlation values is generated.

In step 108, for each attribute group in said set of attribute groups, a correlation value for the attribute group is generated using the feature vector for the attribute group and the correlation model.

Figure 2:
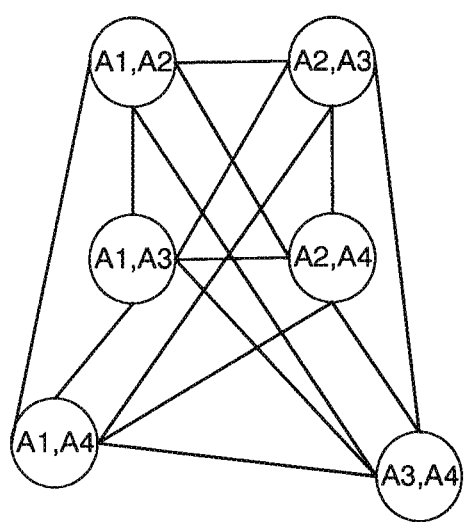
FIG. 2 is a diagram illustrating a set of attribute groups that is logically interconnected.

In step 111, for each attribute group in said set of attribute groups, the attribute group is logically connected to each other attribute group included in said set of attribute groups. Each logical connection between the attribute group and one of the other attribute groups is assigned a similarity value based on a determined similarity between the feature vector for the attribute group and the feature vector for the other attribute group. This feature is illustrated in FIG. 2, which shows a set of attribute groups (or, more specifically, a set of attribute pairs). In the example shown, there are four attributes and, therefore, six unique pairs of attributes (i.e., A1/A2, A1/A3, A1/A4, A2/A3, A2/A4, and A3/A4).

In step 112, for each attribute group included in the first subset of attribute groups, a label is assigned to the attribute group based on predetermined information about the correlation among the attributes in the attribute group.

In step 114, an attribute group from the second subset of attribute groups is selected (e.g., selected at random).

In step 116, for each logical connection connecting the selected attribute group to an attribute group included in the first subset of attribute groups, the value assigned to the logical connection is obtained.

In step 118, using the obtained values and the generated correlation value for the selected attribute group, a determination is made as to whether a label should be assigned to the selected attribute group.

In step 120, a determined label is assigned to the selected attribute group if it was determined in step 118 that a label should be assigned to the selected attribute group.

Steps 114-120 are repeated for each other attribute group included in the second subset of attribute groups.

Figure 3:
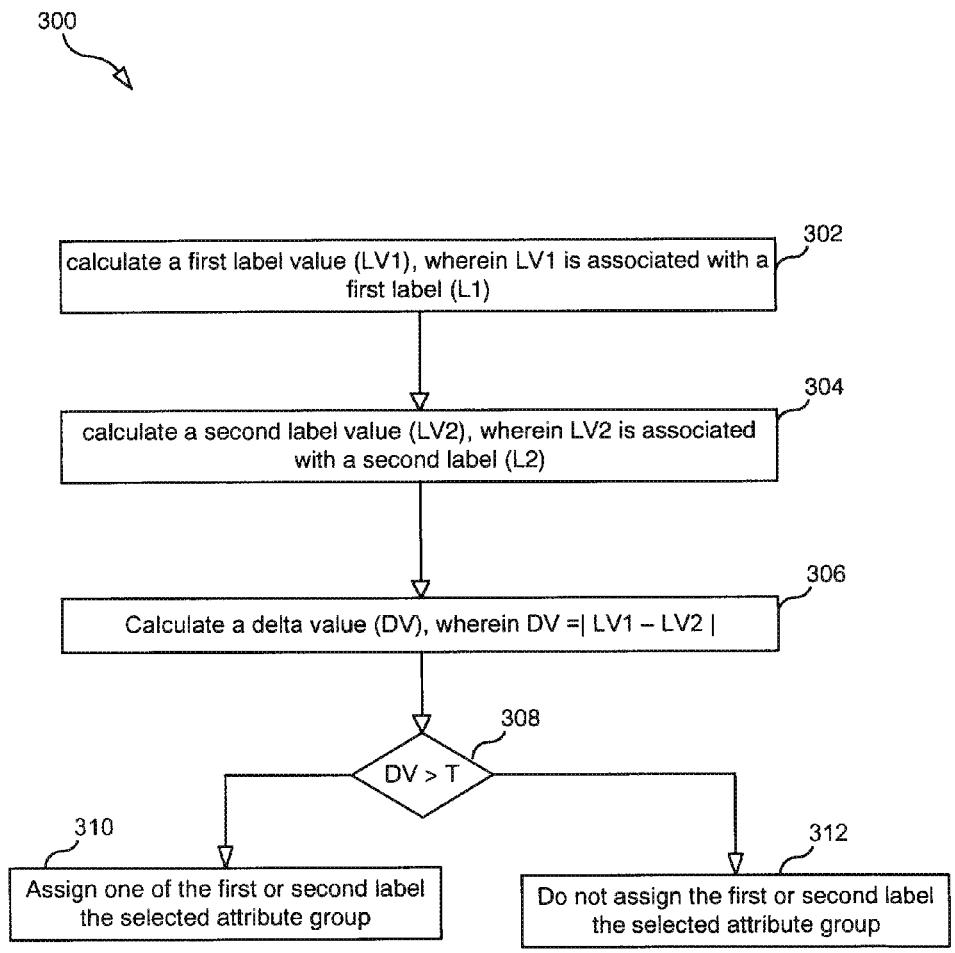
FIG. 3 is a flow chart illustrating a process according to some embodiments.

FIG. 3 is a flow chart illustrating a process 300 for determining whether a label should be assigned to the selected attribute group.

Process 300 begins in step 302, where a first label value associated with a first label is calculated. In some embodiments, the first label value (LV1) is calculated as using the following equation: $LV1=\alpha*\Omega(fv)+\beta*Sim\_L1$, where $\alpha$ and $\beta$ are predetermined relative weight values (i.e., $\alpha+\beta=1$) (in some embodiments $\alpha=\beta=0.5$), fv is the feature vector for the selected attribute group, $\Omega(\ )$ is the model that maps the feature vector fv to a correlation value, Sim_L1 is a value representing the similarity between the selected attribute group and a set of other attribute groups each of which has been assigned the first label.

In step 304, a second label value (LV2) associated with a second label is calculated. In some embodiments, LV2 is calculated as using the following equation: $LV2=\alpha*(1-\Omega(fv))+\beta*Sim\_L2$, where Sim_L2 is a value representing the similarity between the selected attribute group and a set of other attribute groups each of which has been assigned the second label.

In step 306, a delta value (DV) is calculated, where $DV=|LV1-LV2|$.

In step 308 it is determined whether DV>T, where T is a predetermined threshold value. If DV>T is true, then it is determined that a label (i.e., the first label or the second label) should be assigned to the selected node (step 310), otherwise it is determined that neither the first nor the second label should be assigned (step 312). In some embodiments, the first label is assigned to the selected attribute group if LV1>LV2, otherwise the second label is assigned to the selected attribute group.

Figure 4:
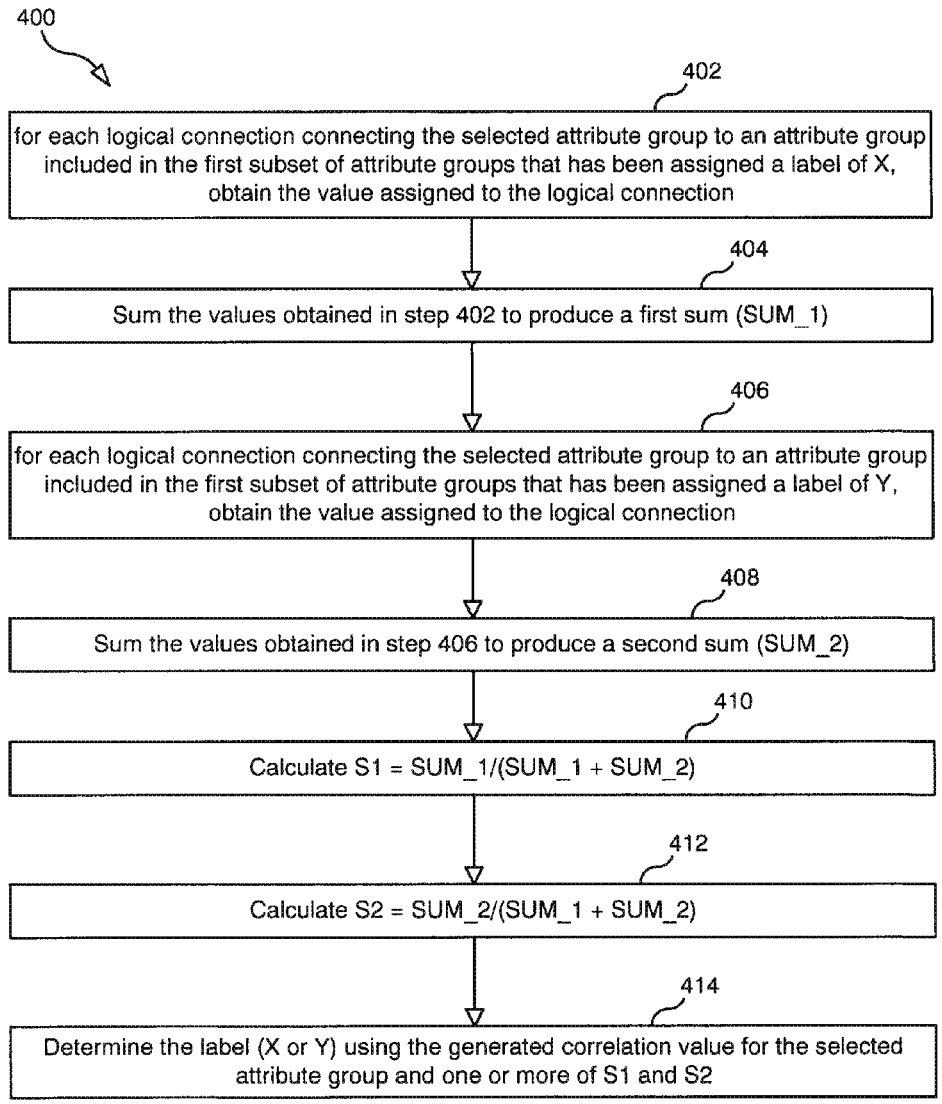
FIG. 4 is a flow chart illustrating a process according to some embodiments.

FIG. 4 is a flow chart illustrating a process 400 according to other embodiments for determining the label (X or Y) to assign to the selected attribute group.

Process 400 begin in step 402, where for each logical connection connecting the selected attribute group to an attribute group included in the first subset of attribute groups that has been assigned a label of X, the value assigned to the logical connection is obtained.

In step 404, the values obtained in step 402 are summed to produce a first sum (SUM_1).

In step 406, for each logical connection connecting the selected attribute group to an attribute group included in the first subset of attribute groups that has been assigned a label of Y, the value assigned to the logical connection is obtained.

In step 408, the values obtained in step 406 are summed to produce a second sum (SUM_2).

In step 410, the value S1 is calculated as S1=SUM_1/(SUM_1+SUM_2).

In step 412, the value S2 is calculated as S2=SUM_2/(SUM_1+SUM_2).

In step 414, the label is determined using the generated correlation value for the selected attribute group and one or more of S1 and S2.

Figure 5:
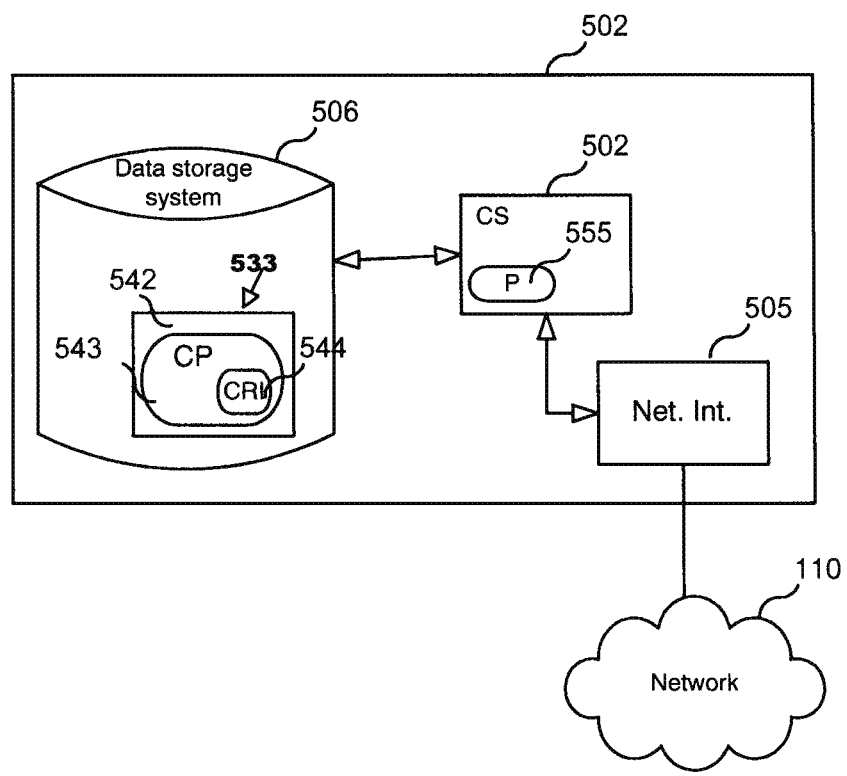
FIG. 5 is a diagram illustrating a computer apparatus according to some embodiments.

FIG. 5 illustrates a block diagram of a computer apparatus 502 according to embodiments. As shown in FIG. 5, computer apparatus 502 may include or consist of: a computer system (CS) 502, which may include one or more processors 555 (e.g., a microprocessor) and/or one or more circuits, such as an application specific integrated circuit (ASIC), field-programmable gate arrays (FPGAs), a logic circuit, and the like; a network interface 505 for connecting computer apparatus to a network 110; a data storage system 506, which may include one or more non-volatile storage devices and/or one or more volatile storage devices (e.g., random access memory (RAM)). In embodiments where computer apparatus 502 includes a processor 555, a computer program product (CPP) 533 may be provided. CPP 533 includes or is a computer readable medium (CRM) 542 storing a computer program (CP) 543 comprising computer readable instructions (CRI) 544 for performing steps described herein (e.g., one or more of the steps shown in the described flow charts). CP 543 may include an operating system (OS) and/or application programs. CRM 542 may include a non-transitory computer readable medium, such as, but not limited to, magnetic media (e.g., a hard disk), optical media (e.g., a DVD), solid state devices (e.g., random access memory (RAM), flash memory), and the like. That is, in some embodiments, the CRI 544 of computer program 543 are configured such that when executed by computer system 502, the CRI causes the computer apparatus 502 to perform steps described above (e.g., steps described above with reference to the flow charts). In other embodiments, apparatus 502 may be configured to perform steps described herein without the need for a computer program. That is, for example, computer system 502 may consist merely of one or more ASICs. Hence, the features of the embodiments described herein may be implemented in hardware and/or software.

Results

We evaluate the above process using an example (a.k.a., "toy") dataset. The objective behind evaluation on toy dataset is to specify that with a very small example set, the proposed method could capture the business requirement for correlation effectively and achieve it as a learning problem.

The toy dataset includes four attributes (A, B, C and D), which take Boolean values. The values for each attribute are show below in Table 1:

TABLE 1

| A | B | C | D |
|---|---|---|---|
| 1 | 0 | 0 | 1 |
| 1 | 0 | 0 | 0 |
| 0 | 1 | 0 | 1 |
| 0 | 1 | 1 | 1 |

A correlation coefficient between all-pairs was determined and the table below (Table 2) shows the correlation coefficient:

TABLE 2

| A, B | −0.75    | A, D | −0.43301 |
|------|----------|------|----------|
| A, C | −0.43301 | B, C | 0.43301  |
| B, A | −0.75    | B, D | 0.43301  |
| C, A | −0.43301 | C, D | 0.25     |
|      |          | C, B | 0.43301  |
|      |          | D, B | 0.43301  |
|      |          | D, C | 0.25     |
|      |          | D, A | −0.43301 |

Case I: To Show the Use of Graph Formulation

Correlation requirement: A is correlated with B if whenever one variable is set (1), other variable must not be set (0). By this definition we can call the attribute pairs to the left as correlated (4 pairs—A,B; A,C; B,A; C,A), and to the right as un-correlated (A,D; B,C; B,D; C,D; C,B; D,B; D,C; D,A). We can see that it cannot be identified using correlation coefficient value.

We can transform this as a proposed graph learning problem with 12 nodes (for every pair) and with source (correlated) and sink (un-correlated) nodes. Edge weight between the nodes will be similarity of the feature values (correlation coefficient).

We compute distance between nodes using a simple squared difference, which is given below in Table 3 (note that edge weight could be inverse, negative loss or any other transformation of the distance function):

correlation value by using multiple scores as the feature representation for the learning. Additionally when there is a partial supervision (small example set), it can be used by adding edges between attribute pairs and correlated-uncorrelated (source/sink) nodes accordingly. The edge weights between those labeled pairs and source/sink nodes can be given a very high value, so that misclassification would add more penalty than normal cases. Similarly, edge weights between unlabeled pairs and source/sink nodes would have the probability given by the classifier built with labeled set. With this toy dataset example we can see that the proposed method can help in handling correlation requirements which capture the business needs in a better way.

Case II: Correlation Requirement with an Example Set—Use of Meta-Correlation Method and Semi-Supervised Method.

There can be cases where a set of KPIs are correlated w.r.t user opinion score, another set w.r.t revenue assurance and some other set of KPIs w.r.t 'mobile' users. So the context of correlation (meta factors) could be different in each of the cases. The intuition behind the proposed method is to characterize the available correlation features and the similarity between correlation values. Characterizing the correlation features is achieved by learning a classifier on the feature values. In-order to show the effectiveness, we create a dataset where there are 100 attributes pairs and 10 correlation measures. For evaluation purpose we generate the correlation values for all the attribute pairs—using random normal distribution. And, we show that for various labeling (correlated/uncorrelated) setups, the proposed meta-correlation method estimates parameters suitably. Each labeling setup would be a combination of conditions applied on 2 or more correlation values, for instance if Column $X \geq \lambda$ and Column $Y < \delta$ then we call that pair as correlated.

Dataset: Nodes with 10 attributes (correlation measures) are generated using a normal random distribution. 50 nodes are with a spread of 1 and mean-shifted by −2.5 and other 50 nodes are with a spread of 2 and mean-shifted by +2.5. Note that data is naturally split into 2 clusters. Even then for a given domain requirement of different labeling setups, the proposed method learns the parameters adaptively.

Labeling setups: Setup 1: If measures 1 & 4 are <0.8, and if measure 2>0.2 then the pair is correlated. Else it is not correlated. (41 positives and 59 negative samples) Setup 2:

TABLE 3

|      | A, B     | A, C     | A, D     | B, C     | B, D     | C, D     | B, A     | C, A     | C, B     | D, A     | D, B     | D, C     |
|------|----------|----------|----------|----------|----------|----------|----------|----------|----------|----------|----------|----------|
| A, B |          |          |          |          |          |          |          |          |          |          |          |          |
| A, C | 0.100483 |          |          |          |          |          |          |          |          |          |          |          |
| A, D | 0.100483 | 0        |          |          |          |          |          |          |          |          |          |          |
| B, C | 1.399513 | 0.749991 | 0.749991 |          |          |          |          |          |          |          |          |          |
| B, D | 1.399513 | 0.749991 | 0.749991 | 0        |          |          |          |          |          |          |          |          |
| C, D | 1        | 0.466503 | 0.466503 | 0.033493 | 0.033493 |          |          |          |          |          |          |          |
| B, A | 0        | 0.100483 | 0.100483 | 1.399513 | 1.399513 | 1.399513 |          |          |          |          |          |          |
| C, A | 0.100483 | 0        | 0        | 0.749991 | 0.749991 | 0.466503 | 0.100483 |          |          |          |          |          |
| C, B | 1.399513 | 0.749991 | 0.749991 | 0        | 0.749991 | 0.033493 | 1.399513 | 0.749991 |          |          |          |          |
| D, A | 0.100483 | 0        | 0.187498 | 0.749991 | 0.749991 | 0.466503 | 0.100483 | 0        | 0.749991 |          |          |          |
| D, B | 1.399513 | 0.749991 | 0.749991 | 0        | 0        | 0.033493 | 1.399513 | 0.749991 | 0        | 0.749991 |          |          |
| D, C | 1        | 0.466503 | 0.466503 | 0.033493 | 0.033493 | 0        | 1        | 0.466503 | 0.033493 | 0.466503 | 0.033493 |          |

From Table 3 above we can see that a simple clustering based on distances (lower the distance similar the nodes and we group them together) helps in finding correlated pairs better than using a simple correlation coefficient which acts as the feature representation for the proposed technique. Similarly the proposed method can leverage more than one If measures 2, 6, 9 are <0.85, measure 4 is >0.15 and measure 3<0.5 then it is correlated. (36 positives and 64 negative samples) Else it is not correlated. Setup 3: If measure 5 is >0, 8 is <0.6 and 10<0.4 then it its correlated. Else it is not correlated. (38 positives and 62 negative samples)

Results: Experimental results for each of the setup using proposed framework with 30% labeled samples and 70% unlabeled is given below in Table 4:

TABLE 4

|  | Accuracy | F1_P | F1_N |
|---|---|---|---|
| Setup 1 | 0.8729 | 0.8797 | 0.8646 |
| Setup 2 | 0.8508 | 0.8684 | 0.8272 |
| Setup 3 | 0.8743 | 0.8859 | 0.8589 |

From the results we can see that even with the same raw values and static distance function, the proposed system can learn parameters for the given domain requirement.

While various embodiments have been described above, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computer implemented method for multivariate attribute correlation, the method comprising:
   a) forming a set of attribute groups, said set comprising a first subset of attribute groups and a second subset of attribute groups, wherein the first subset and the second subset are disjoint sets;
   b) for each attribute group in said set of attribute groups, generating a feature vector comprising a plurality of correlation measure values;
   c) generating a correlation model for mapping feature vectors to correlation values;
   d) for each attribute group in said set of attribute groups, using the feature vector for the attribute group and the correlation model to generate a correlation value for the attribute group;
   e) for each attribute group in said set of attribute groups, logically connecting the attribute group to each of other attribute groups included in said set of attribute groups, wherein each logical connection between the attribute group and one of the other attribute groups is assigned a similarity value based on a determined similarity between the feature vector for the attribute group and the feature vector for the other attribute group;
   f) for each attribute group included in the first subset of attribute groups, assigning a label to the attribute group based on predetermined information about the multivariate attribute correlation among attributes in the attribute group;
   g) selecting an attribute group from the second subset of attribute groups;
   h) for each logical connection, connecting the selected attribute group to an attribute group included in the first subset of attribute groups, and obtaining the similarity value assigned to the logical connection;
   i) using the obtained similarity values and the generated correlation value for the selected attribute group, determining whether a label should be assigned to the selected attribute group;
   j) assigning a determined label to the selected attribute group if it was determined that a label should be assigned to the selected attribute group; and
   k) repeating steps g), h), i), and j) for each of the other attribute groups included in the second subset of attribute groups,
   wherein the step of determining whether a label should be assigned to the selected attribute group comprises the steps of:
      calculating a first label value (LV1), wherein LV1 is associated with a first label (L1);
      calculating a second label value (LV2), wherein LV2 is associated with a second label (L2);
      calculating a delta value (DV), wherein DV=|LV1−LV2|; and
      determining whether DV is greater than a predetermined threshold (T), wherein if DV>T, then one of the first label or the second label is assigned to the selected attribute group.

2. The computer implemented method of claim 1, wherein the step of selecting an attribute group from the second subset of attribute groups comprises randomly selecting an attribute group from the second subset of attribute groups.

3. The computer implemented method of claim 1, wherein $LV1=\alpha*\Omega(fv)+\beta*Sim\_L1$, where $\alpha$ and $\beta$ are predetermined relative weight values, fv is the feature vector for the selected attribute group, $\Omega( )$ is the correlation model that maps the feature vector fv to a correlation value, and Sim_L1 is a value representing the similarity between the selected attribute group and a set of other attribute groups, each of which has been assigned the first label, and
$LV2=\alpha*(1-\Omega(fv))+\beta*Sim\_L2$, where Sim_L2 is a value representing the similarity between the selected attribute group and a set of other attribute groups, each of which has been assigned the second label.

4. The computer implemented method of claim 1, further comprising determining the label to assign to the selected attribute group, wherein determining the label to assign to the selected attribute group comprises the steps of:
   i) for each logical connection, connecting the selected attribute group to an attribute group included in the first subset of attribute groups that has been assigned a label of X, obtaining the similarity value assigned to the logical connection, and summing the obtained similarity values to produce a first sum (SUM_1);
   ii) for each logical connection, connecting the selected attribute group to an attribute group included in the first subset of attribute groups that has been assigned a label of Y, obtaining the similarity value assigned to the logical connection, and summing the obtained similarity values to produce a second sum (SUM_2);
   iii) calculating S1=SUM_1/(SUM_1+SUM_2);
   iv) calculating S2=SUM_2/(SUM_1+SUM_2); and
   v) determining the label using the generated correlation value for the selected attribute group and one or more of S1 and S2.

5. A computer apparatus for multivariate attribute correlation, the computer apparatus comprising:
   a data storage system; and
   a computer system coupled to the data storage system, the computer system comprising one or more processors for performing a method comprising:

a) forming a set of attribute groups, said set comprising a first subset of attribute groups and a second subset of attribute groups, wherein the first subset and the second subset are disjoint sets;
b) for each attribute group in said set of attribute groups, generating a feature vector comprising a plurality of correlation measure values;
c) generating a correlation model for mapping feature vectors to correlation values;
d) for each attribute group in said set of attribute groups, using the feature vector for the attribute group and the correlation model to generate a correlation value for the attribute group;
e) for each attribute group in said set of attribute groups, logically connecting the attribute group to each of other attribute groups included in said set of attribute groups, wherein each logical connection between the attribute group and one of the other attribute groups is assigned a similarity value based on a determined similarity between the feature vector for the attribute group and the feature vector for the other attribute group;
f) for each attribute group included in the first subset of attribute groups, assigning a label to the attribute group based on predetermined information about the multivariate attribute correlation among attributes in the attribute group;
g) selecting an attribute group from the second subset of attribute groups;
h) for each logical connection, connecting the selected attribute group to an attribute group included in the first subset of attribute groups, and obtaining the similarity value assigned to the logical connection;
i) using the obtained similarity values and the generated correlation value for the selected attribute group, determining whether a label should be assigned to the selected attribute group;
j) assigning a determined label to the selected attribute group if it was determined that a label should be assigned to the selected attribute group; and
k) repeating steps g), h), i), and j) for each of the other attribute groups included in the second subset of attribute groups,
wherein the step of determining whether a label should be assigned to the selected attribute group comprises the steps of:
  calculating a first label value (LV1), wherein LV1 is associated with a first label (L1);
  calculating a second label value (LV2), wherein LV2 is associated with a second label (L2);
  calculating a delta value (DV), wherein DV=|LV1−LV2|; and
  determining whether DV is greater than a predetermined threshold (T), wherein if DV>T, then one of the first label or the second label is assigned to the selected attribute group.

6. The computer apparatus of claim 5, wherein the step of selecting an attribute group from the second subset of attribute groups comprises randomly selecting an attribute group from the second subset of attribute groups.

7. The computer apparatus of claim 5, wherein LV1=$\alpha$*$\Omega$(fv)+$\beta$*Sim_L1, where $\alpha$ and $\beta$ are predetermined relative weight values, fv is the feature vector for the selected attribute group, $\Omega$( ) is the correlation model that maps the feature vector fv to a correlation value, and Sim_L1 is a value representing the similarity between the selected attribute group and a set of other attribute groups, each of which has been assigned the first label, and
LV2=$\alpha$*(1−$\Omega$(fv))+$\beta$*Sim_L2, where Sim_L2 is a value representing the similarity between the selected attribute group and a set of other attribute groups, each of which has been assigned the second label.

8. The computer apparatus of claim 5, wherein the method further comprises determining the label to assign to the selected attribute group, wherein determining the label to assign to the selected attribute group comprises the steps of:
  i) for each logical connection, connecting the selected attribute group to an attribute group included in the first subset of attribute groups that has been assigned a label of X, obtaining the similarity value assigned to the logical connection, and summing the obtained similarity values to produce a first sum (SUM_1);
  ii) for each logical connection, connecting the selected attribute group to an attribute group included in the first subset of attribute groups that has been assigned a label of Y, obtaining the similarity value assigned to the logical connection, and summing the obtained similarity values to produce a second sum (SUM_2);
  iii) calculating S1=SUM_1/(SUM_1+SUM_2);
  iv) calculating S2=SUM_2/(SUM_1+SUM_2); and
  v) determining the label using the generated correlation value for the selected attribute group and one or more of S1 and S2.

9. A computer program product comprising a non-transitory computer readable medium having stored thereon instructions, that in response to execution by a processor, cause the processor to perform operations comprising:
a) forming a set of attribute groups, said set comprising a first subset of attribute groups and a second subset of attribute groups, wherein the first subset and the second subset are disjoint sets;
b) for each attribute group in said set of attribute groups, generating a feature vector comprising a plurality of correlation measure values;
c) generating a correlation model for mapping feature vectors to correlation values;
d) for each attribute group in said set of attribute groups, using the feature vector for the attribute group and the correlation model to generate a correlation value for the attribute group;
e) for each attribute group in said set of attribute groups, logically connecting the attribute group to each of other attribute groups included in said set of attribute groups, wherein each logical connection between the attribute group and one of the other attribute groups is assigned a similarity value based on a determined similarity between the feature vector for the attribute group and the feature vector for the other attribute group;
f) for each attribute group included in the first subset of attribute groups, assigning a label to the attribute group based on predetermined information about the multivariate attribute correlation among attributes in the attribute group;
g) selecting an attribute group from the second subset of attribute groups;
h) for each logical connection, connecting the selected attribute group to an attribute group included in the first subset of attribute groups, and obtaining the similarity value assigned to the logical connection;

i) using the obtained similarity values and the generated correlation value for the selected attribute group, determining whether a label should be assigned to the selected attribute group;
j) assigning a determined label to the selected attribute group if it was determined that a label should be assigned to the selected attribute group; and
k) repeating steps g), h), i), and j) for each of the other attribute groups included in the second subset of attribute groups,
wherein the step of determining whether a label should be assigned to the selected attribute group comprises the steps of:
  calculating a first label value (LV1), wherein LV1 is associated with a first label (L1);
  calculating a second label value (LV2), wherein LV2 is associated with a second label (L2);
  calculating a delta value (DV), wherein DV=|LV1−LV2|; and
  determining whether DV is greater than a predetermined threshold (T), wherein if DV>T, then one of the first label or the second label is assigned to the selected attribute group.

10. The computer program product of claim 9, wherein the step of selecting an attribute group from the second subset of attribute groups comprises randomly selecting an attribute group from the second subset of attribute groups.

11. The computer program product of claim 9, wherein $LV1=\alpha*\Omega(fv)+\beta*Sim\_L1$, where $\alpha$ and $\beta$ are predetermined relative weight values, fv is the feature vector for the selected attribute group, $\Omega(\ )$ is the correlation model that maps the feature vector fv to a correlation value, and Sim_L1 is a value representing the similarity between the selected attribute group and a set of other attribute groups, each of which has been assigned the first label, and
$LV2=\alpha*(1-\Omega(fv))+\beta*Sim\_L2$, where Sim_L2 is a value representing the similarity between the selected attribute group and a set of other attribute groups, each of which has been assigned the second label.

12. The computer program product of claim 9, further comprising computer instructions for:
  i) for each logical connection, connecting the selected attribute group to an attribute group included in the first subset of attribute groups that has been assigned a label of X, obtaining the similarity value assigned to the logical connection, and summing the obtained similarity values to produce a first sum (SUM_1);
  ii) for each logical connection, connecting the selected attribute group to an attribute group included in the first subset of attribute groups that has been assigned a label of Y, obtaining the similarity value assigned to the logical connection, and summing the obtained similarity values to produce a second sum (SUM_2);
  iii) calculating S1=SUM_1/(SUM_1+SUM_2);
  iv) calculating S2=SUM_2/(SUM_1+SUM_2); and
  v) determining the label using the generated correlation value for the selected attribute group and one or more of S1 and S2.

* * * * *